US012614977B2

(12) United States Patent
Langeslag et al.

(10) Patent No.: US 12,614,977 B2
(45) Date of Patent: Apr. 28, 2026

(54) ADAPTIVE TRANSITION TIME MEASUREMENT IN AN ASYMMETRICAL HALF BRIDGE

(71) Applicant: NXP USA, Inc., Austin, TX (US)

(72) Inventors: Wilhelmus Hinderikus Maria Langeslag, Wijchen (NL); Peter Theodorus Johannes Degen, Arnhem (NL)

(73) Assignee: NXP USA, Inc., Austin, TX (US)

( * ) Notice: Subject to any disclaimer, the term of this patent is extended or adjusted under 35 U.S.C. 154(b) by 204 days.

(21) Appl. No.: 18/528,307

(22) Filed: Dec. 4, 2023

(65) Prior Publication Data

US 2025/0183795 A1      Jun. 5, 2025

(51) Int. Cl.
H02M 3/335      (2006.01)
H02M 1/00      (2006.01)
H02M 3/00      (2006.01)

(52) U.S. Cl.
CPC ........... H02M 3/01 (2021.05); H02M 1/0009 (2021.05); H02M 3/33571 (2021.05)

(58) Field of Classification Search
CPC ..................... H02M 1/0009; H02M 3/335–42
See application file for complete search history.

(56) References Cited

U.S. PATENT DOCUMENTS

| | | | | | |
|---|---|---|---|---|---|
| 4,137,907 | A | * | 2/1979 | Jansen | ................. A61B 5/7242 600/494 |
| 10,797,582 | B1 | | 10/2020 | Medina-Garcia | |
| 10,892,687 | B2 | | 1/2021 | Fahlenkamp | |
| 11,018,592 | B2 | | 5/2021 | Ausseresse | |
| 2010/0085782 | A1 | * | 4/2010 | Halberstadt | ....... H02M 3/33571 363/25 |
| 2022/0294358 | A1 | | 9/2022 | Wang | |
| 2022/0416644 | A1 | | 12/2022 | Xu | |
| 2023/0020390 | A1 | | 1/2023 | Wang | |

(Continued)

FOREIGN PATENT DOCUMENTS

| | | |
|---|---|---|
| CN | 112928923 A | 6/2021 |
| CN | 116317481 A | 6/2023 |
| IN | 201611014019 A | 10/2017 |

OTHER PUBLICATIONS

Alfredo Medina-Garcia et al., "Advanced Control Methods for Asymmetrical Half-Bridge Flyback," IEEE Transactions on Power Electronics, vol. 36, No. 11, Nov. 2021, pp. 13139-13148.

(Continued)

*Primary Examiner* — Peter M Novak

(57)      ABSTRACT

An adaptive transition controller for a resonant converter system, including: a derivative circuit configured to receive a first signal indicative of a resonant current through an inductor in the resonant converter system and produce a derivative signal indicative of a derivative of the first signal; a peak detector circuit configured to produce a peak signal indicative of a peak value of the derivative signal over a time period; an integrator circuit configured to integrate the peak signal to produce an extension signal; and a comparator circuit configured to produce an end transition signal when the extension signal exceeds a second signal indicative of the magnetizing current in a magnetizing inductance of a transformer in the resonant converter system.

19 Claims, 9 Drawing Sheets

(56) References Cited

U.S. PATENT DOCUMENTS

2024/0333125 A1* 10/2024 Liu ................... H02M 3/33576

OTHER PUBLICATIONS

Laszlo Huber et al., "Analysis, Design, and Performance Evaluation of Asymmetrical Half-Bridge Flyback Converter for Universal-Line-Voltage-Range Applications," IEEE 978-1-5090-5366-7/17, 2017, pp. 2481-2487.

Cabizza Stefano et al: "GaN-Based Isolated Resonant Converter as a Backup Power Supply in Automotive Subnets"; IEEE Transactions on Power Electronics; vol. 38, No. 6, Jun. 2023; 12 pages.

Cheng Kai-Hung et al: "Design and Implementation of Asymmetric Half-Bridge Flyback Converter for USB Power Delivery Applications"; 11th International Conference on Power Electronics-ECCE Asia; May 2023; 8 pages.

Spiazzi Giorgio et al: "Extended Analysis of the Asymmetrical Half-Bridge Flyback Converter"; IEEE Transactions on Power Electronics; vol. 36, No. 7; Jul. 2021; 9 pages.

Spiazzi Giorgio et al: "The Asymmetrical Half-Bridge Flyback Converter: a Reexamination" 2020 IEEE Energy Conversion Congress and Exposition; Oct. 2020; 7 pages.

* cited by examiner

ADAPTIVE TRANSITION TIME MEASUREMENT IN AN ASYMMETRICAL HALF BRIDGE

FIELD OF THE DISCLOSURE

Various exemplary embodiments disclosed herein relate to an adaptive transition time measurement in an asymmetrical half bridge.

BACKGROUND

The USB-C connector standard will be mandatory for charging phones and laptops in the future. The current of the USB-C connector is limited to 5 A. To get a higher power the output voltage is increased to higher voltages. In the latest standard the output voltage can be up to 48V, while the system still has to support 5V. To support a wide output voltage range, an asymmetrical half bridge converter can be used.

SUMMARY

A summary of various exemplary embodiments is presented below.

Various embodiments relate to an adaptive transition controller for a resonant converter system, including: a derivative circuit configured to receive a first signal indicative of a resonant current through an inductor in the resonant converter system and produce a derivative signal indicative of a derivative of the first signal; a peak detector circuit configured to produce a peak signal indicative of a peak value of the derivative signal over a time period; an integrator circuit configured to integrate the peak signal to produce an extension signal; and a comparator circuit configured to produce an end transition signal when the extension signal exceeds a second signal indicative of the magnetizing current in a magnetizing inductance of a transformer in the resonant converter system.

Various embodiments are described, further including an extension filter connected to the derivative circuit, wherein the extension filter is configured to filter the first signal.

Various embodiments are described, further including a signal filter connected to the integration circuit via a first switch, wherein the signal filter is configured to filter the first signal.

Various embodiments are described, wherein the extension filter is a higher order filter than the signal filter.

Various embodiments are described, wherein the integration circuit is configured to start integrating the peak signal at an extension start time, and the first switch is configured to be closed at a beginning of an operation cycle and to be opened at the extension start time.

Various embodiments are described, wherein the extension start time is based upon a prior transition time during a prior operating cycle of the resonant converter system.

Various embodiments are described, wherein the extension start time is based upon a filtered prior transition time during a prior operating cycle of the resonant converter system.

Various embodiments are described, wherein the first switch is connected to a capacitor in the integrator circuit.

Various embodiments are described, wherein the capacitor in the integrator circuit holds a voltage based upon the first signal when the first switch is closed and a voltage based upon the first signal plus the integrated derivative signal when the first switch is opened.

Various embodiments are described, further including a derivative filter connected to the derivative circuit, the derivative filter configured to filter the derivative signal; and a derivative comparator configured to produce a derivative greater that zero signal when the derivative signal exceeds zero during a secondary stroke of an operating cycle of the resonant converter system.

Various embodiments are described, wherein the integration circuit is configured to start integrating the peak signal at an extension start time if the derivative greater that zero signal indicates that the derivative signal exceeds zero.

Various embodiments are described, wherein the peak detector circuit includes a reset circuit configured to reset the peak detector circuit.

Various embodiments are described, wherein the reset circuit is configured to release the peak detector circuit after the derivative signal reaches a minimum value.

Further various embodiments relate to an adaptive transition controller for a resonant converter system, including: a subtractor circuit configured to produce a difference signal that is a difference between a first signal indicative of a current through an inductor in the resonant converter system and a second signal indicative of the magnetizing current through a transformer in the resonant converter system; a derivative circuit configured to receive the difference signal and produce a derivative signal indicative of a derivative of the difference signal; a peak detector circuit configured to produce a peak signal indicative of a peak value of the derivative signal over a time period; an integrator circuit configured to integrate the peak signal to produce an extension signal; and a comparator circuit configured to produce an end transition signal when the extension signal exceeds zero.

Various embodiments are described, wherein the integration circuit includes a first switch is controlled by a gate high side control signal, wherein a gate high side signal controls a gate of a gate high side transistor in the resonant converter system and the first switch is configured to be closed at a beginning of an operation cycle and to be opened during an operation cycle of the resonant converter system.

Various embodiments are described, wherein the first switch is connected to a capacitor in the integrator circuit.

Various embodiments are described, wherein the peak detector circuit includes a second switch configured to reset the peak detector circuit.

Various embodiments are described, wherein the second switch is configured to release the peak detector circuit after the derivative signal reaches a minimum value.

Further various embodiments relate to a method for controlling an adaptive transition time of a resonant converter system, including: producing a derivative signal that is a derivative of a received first signal indicative of a resonant current through a inductor in the resonant converter system; producing a peak derivative signal indicative of a peak value of the derivative signal over a time period; integrating the peak derivative signal to produce an extension signal; and a comparing the extension signal to a second signal indicative of the magnetizing current through a magnetizing inductance of a transformer in the resonant converter system to produce an end transition signal when the extension signal exceeds the second signal.

Various embodiments are described, further including: filtering the first signal by a first filter before producing the derivative signal; and filtering the first signal by a second filter wherein integrating the peak derivative signal is based on an output of the second filter, wherein the first filter is a higher order filter than the second filter.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8B illustrates a plot of the signals diff and diff_ext.

FIG. 8C illustrates a plot of the der and der_peak signals.

FIG. 8D illustrates a plot of the signal neg_not_seen signal.

FIG. 8E illustrates a plot of the end_trans signal.

FIG. 10B illustrates a plot of the signals der and der_max VILr_ext.

FIG. 10C illustrates a plot of the rst_snscur_der signal.

FIG. 10D illustrates a plot of the signal der_gt_zero signal.

FIG. 10E illustrates a plot of the t_trans_gt_75% signal.

FIG. 10F illustrates a plot of the timing_snscur_org signal.

FIG. 10G illustrates a plot of the end_trans signal.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of half bridge converter systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

The USB-C connector standard will be mandatory for charging phones and laptops in the future. The current of the USB-C connector is limited to 5 A. To get a higher power the output voltage is increased to higher voltages. In the latest standard the output voltage can be up to 48V, while the system still has to support 5V. To support a wide output voltage range, an asymmetrical half bridge converter can be used.

Figure 1A:
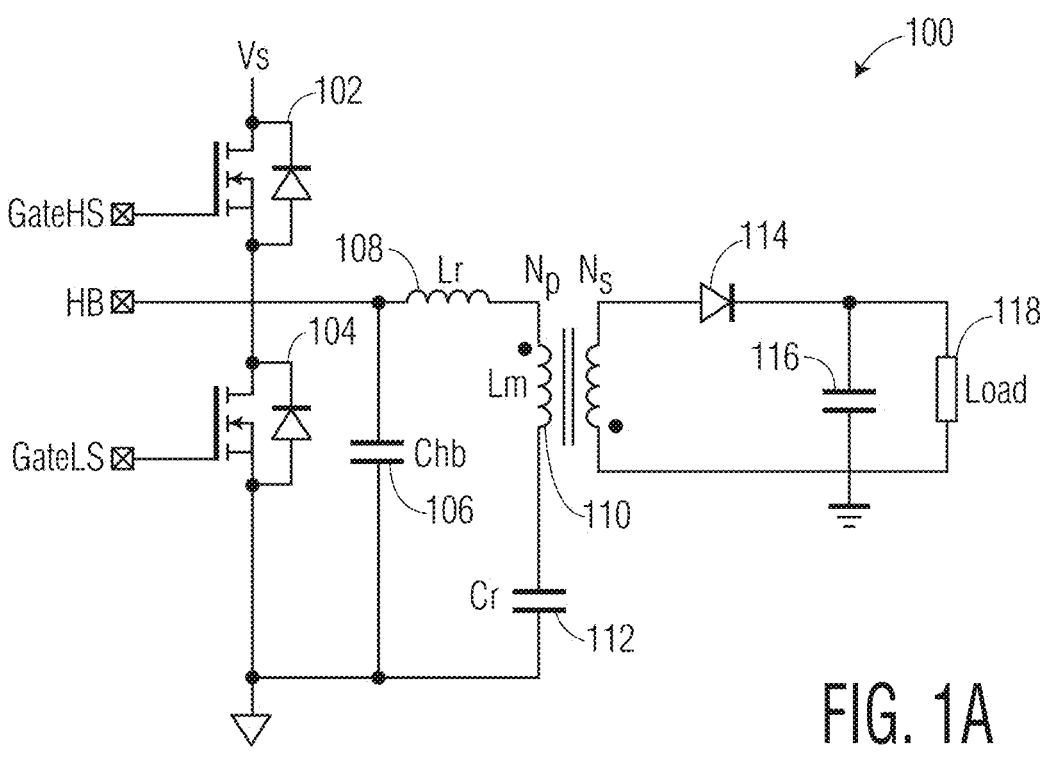
FIGS. 1A and 1B illustrate two different embodiments of asymmetrical half bridge converters.
Figure 1B:
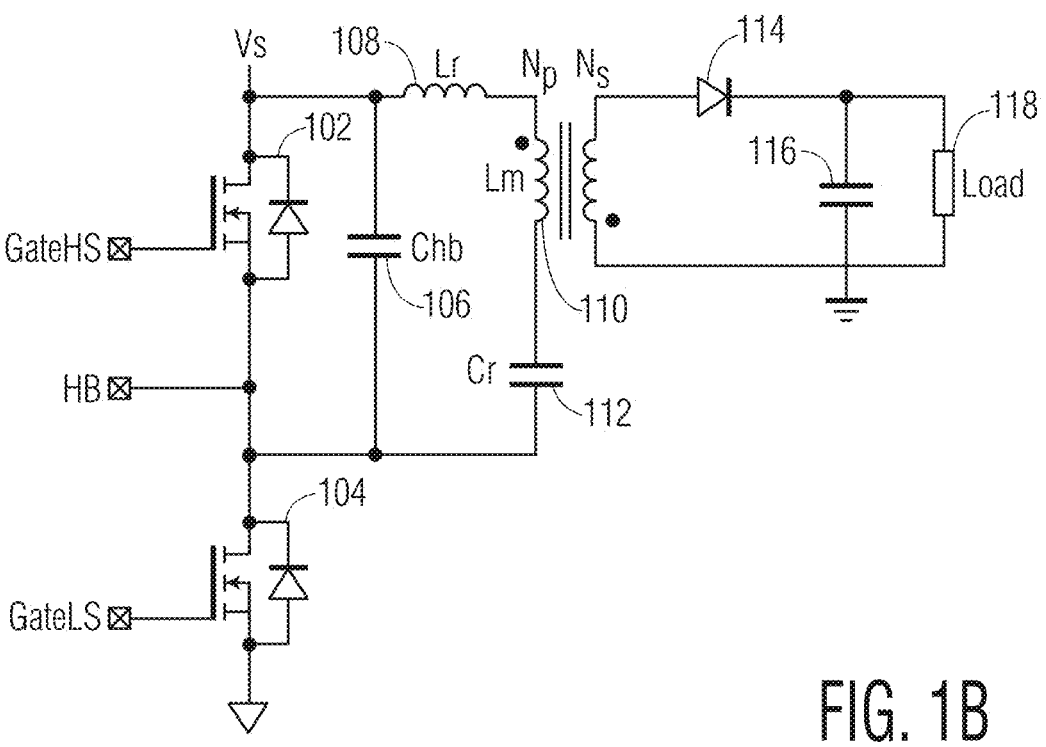

FIGS. 1A and 1B illustrate two different embodiments of asymmetrical half bridge converters. The half bridge converter 100 includes high side transistor 102, low side transistor 104, capacitor Chb 106, resonant inductor Lr 108, magnetic inductor Lm 110, capacitor Cr 112, diode 114, output capacitor 116, and load 118. The half bridge converter 100 receives inputs GateHS, GateLS, and an output HB. It is noted that Chb 106 does not have to be a separate physical capacitor, but this capacitance may be provided by high side transistor 102 or low side transistor 104. Further, inductor Lr 108 and magnetic inductor Lm 110 may also be a single component or may be the result of a leakage inductance of from Lm. GateHS and GateLS are gate control signals that control the gates of high side transistor 102 and low side transistor 104 respectively. HB is output voltage. The input signals are controlled to produce the desired output voltage. The difference between FIGS. 1A and 1B are the arrangements high side transistor 102, low side transistor 104, and the output HB to the rest of the circuit. Other configurations of the half bridge converter 100 also exist.

The half bridge converter 100 has two main phases. In the first phase high side transistor 102 is conducting and low side transistor 104 is open to charge the capacitor Cr 112. In the second phase the high side transistor 102 is open and low side transistor 104 is closed so that the voltage on capacitor Cr 112 is applied to the magnetic inductor Lm 110 to result in an output voltage applied to the load 118. Both of the configurations of FIGS. 1A and 1B may be used with the embodiments described herein, but in the following description the solution will be described for the configuration in FIG. 1A. It shall be clear that the embodiment may also be used for the configuration in FIG. 1B by changing some polarities and swapping the drive of GateLS to GateHS and GateHS to GateLS.

Figure 2A:
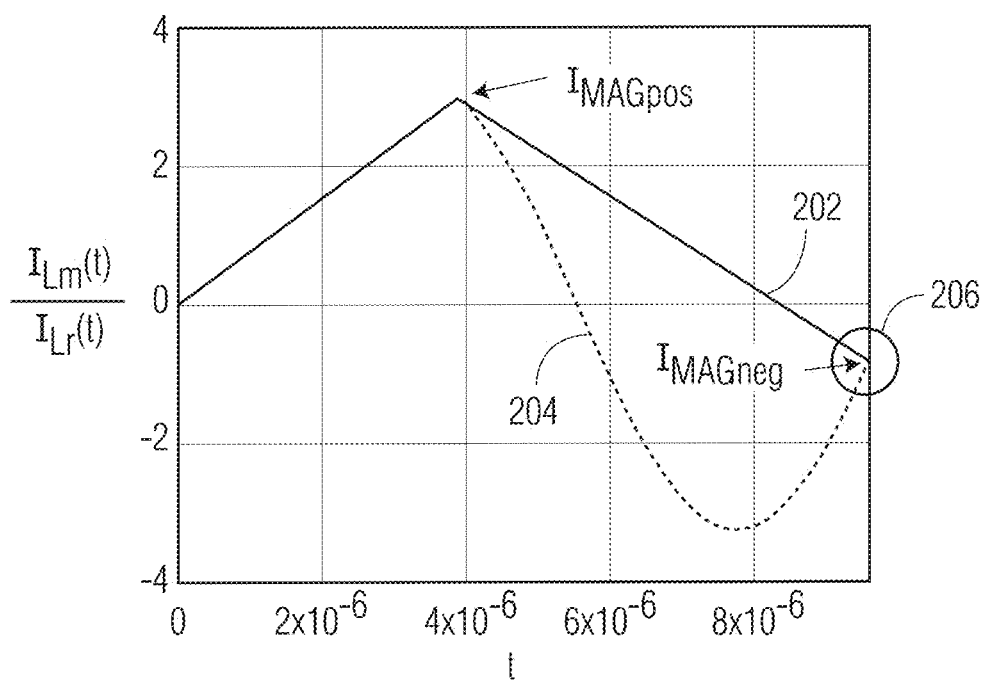
FIG. 2A illustrates a plot of the magnetizing current and the resonant current.
Figure 2B:
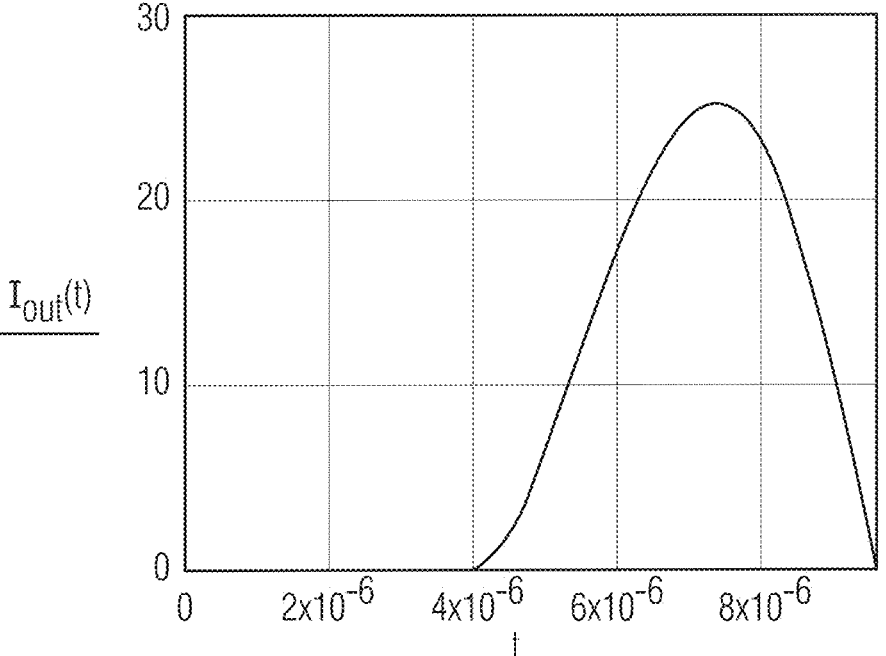
FIG. 2B illustrates the output current.

FIG. 2A illustrates a plot of the magnetizing current and the resonant current. The plot 202 of the magnetizing current illustrates the current through magnetic inductor Lm of the transformer 110. The plot 204 of the resonant current illustrates the current through resonant inductor Lr 108. The current through the resonant inductor Lr 108 differs during the secondary stroke from the current through the magnetic inductor Lr of transformer 110 as illustrated in FIG. 2A. FIG. 2B illustrates the output current. The difference between the resonant and magnetic currents times the transformer ratio of the transformer 110 is the output current of the half bridge converter 100. The current that can be measured is the resonant current, but the magnetizing current cannot be directly measured. It is desired to determine when the magnetizing current and the resonant current are the same again (see 206) in order to control the half bridge converter 100 in the best way.

Figure 3:
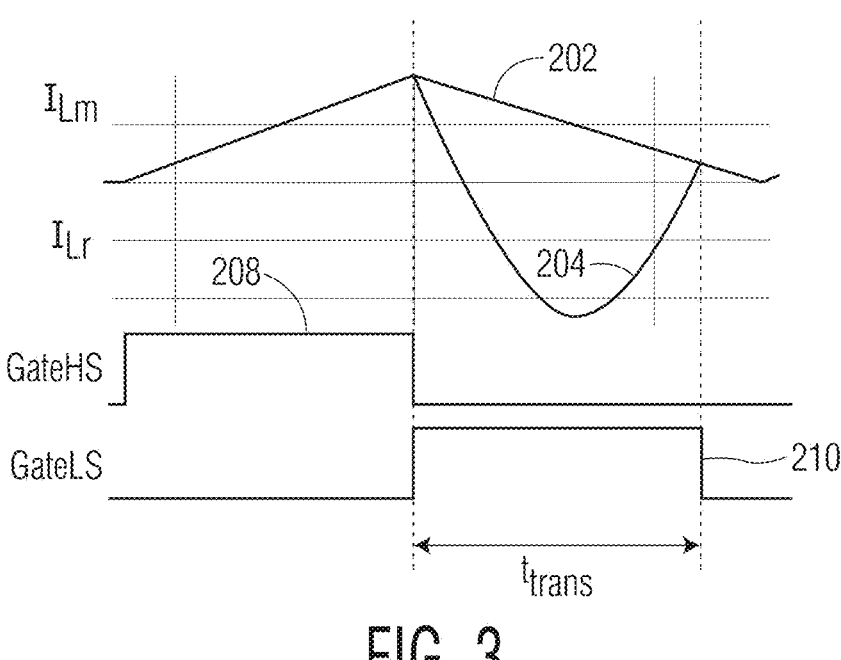
FIG. 3 illustrates the state of the GateHS and GateLS control signals relative to the magnetizing current and the resonant current.

FIG. 3 illustrates the state of the GateHS and GateLS control signals relative to the magnetizing current and the resonant current. When the GateHS control signal 208 is high and the GateLS signal 210 is low, the magnetizing current and the resonant current are the same and increasing linearly. Then when the GateLS is high and the GateHS is low, the magnetizing current 202 drops linearly, but the resonant current 204 drops significantly and then reaches a minimum and then starts increasing again.

It is desired to turn off the GateLS after the ringing of resonant current ILr, because then the system has Zero Current Switching (ZCS). The time of the ringing of resonant current ILr, during the secondary stroke, is related to $$\frac{1}{2} \cdot \sqrt{L_r \cdot C_r}.$$

This ringing time can have a lot of spread, because the resonant inductor (Lr) is made by using the leakage inductance of the transformer. Currently a pre-defined value is used to turn off the GateLS. The use of a pre-defined time though does not account for the tolerance of the leakage inductance, so an adaptive mechanism is described herein.

Figure 4:
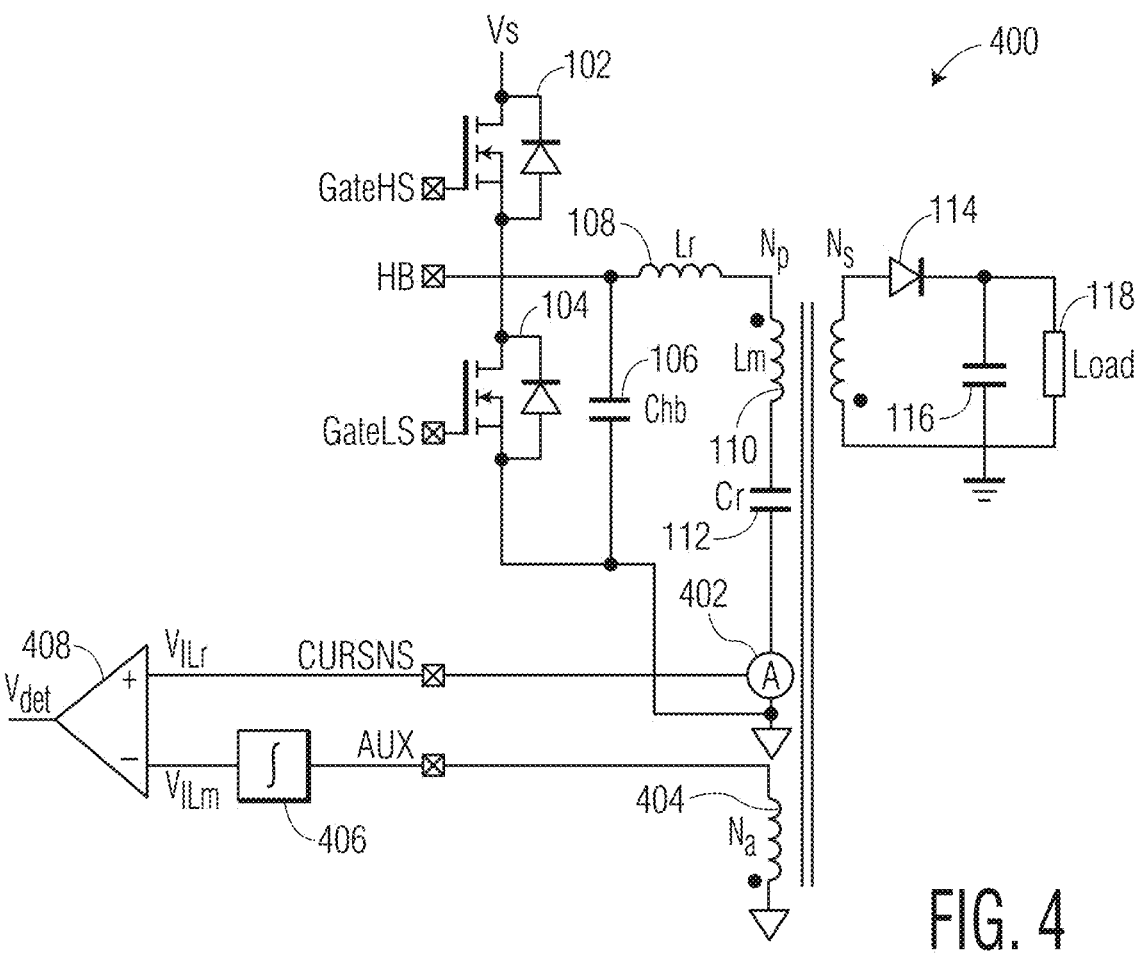
FIG. 4 illustrates a half bridge converter according to an embodiment.

In order to determine the magnetizing current through the transformer 110, the voltage across the transformer 110 may be integrated to determine this current. FIG. 4 illustrates a half bridge converter according to an embodiment. A current sensor 402 converts the resonant current to a voltage VILr. This may just simply be a resistor. A measurement winding 404 is added to the transformer 110 in order to measure the voltage across the transformer 110 (note that the Lr can be the leakage inductance of the transformer). An integrator 406 integrates the voltage across the transformer to produce a voltage VILm that is indicative of the magnetizing current.

A comparator 408 takes the difference between VILr and VILm to produce Vdet which may be a digital signal.

The resonant current Ilr can be directly measured using current sensor 402 and is translated to a voltage and is called VILr. The magnetizing current ILm can be obtained by integrating the voltage across the transformer 110. The reconstructed magnetizing current after integration is called VILm. In theory, the end of the resonant current can be detected when the VILr becomes equal to the VILm, which is indicated by the output of the difference comparator 408 $V_{det}$. In practice this is not possible, because of errors in the system. As described above, an adaptive mechanism may be used to determine when VILr becomes equal to the VILm.

Figure 5:
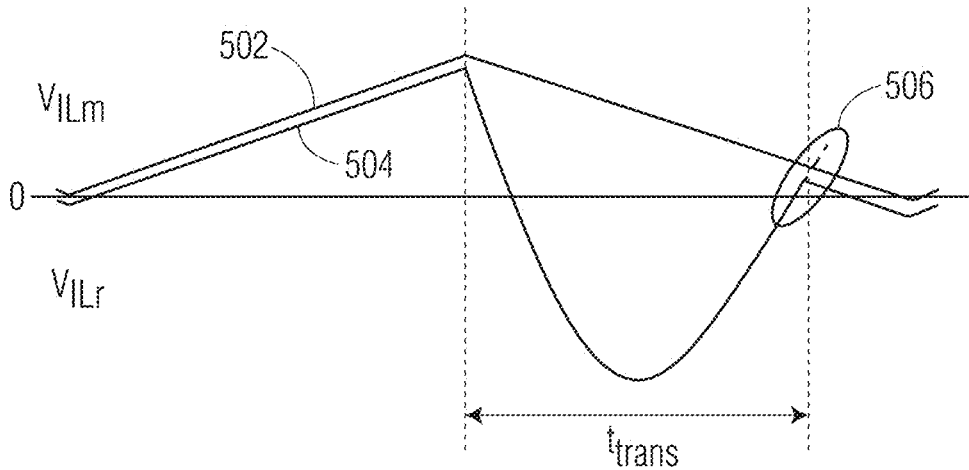
FIG. 5 illustrates a plot of VILm and VILr over a cycle of the half bridge converter.

FIG. 5 illustrates a plot of VILm and VILr over a cycle of the half bridge converter 100. In FIG. 5 it can be seen the value where VILm 502 and VILr 504 are equal cannot be detected, because there is a small offset between VILm and VILr. Therefore, the output of the difference comparator 408 cannot be used to determine the end of the resonance period. For this reason a positive derivative 506 may be used to extend the signal.

Figure 6:
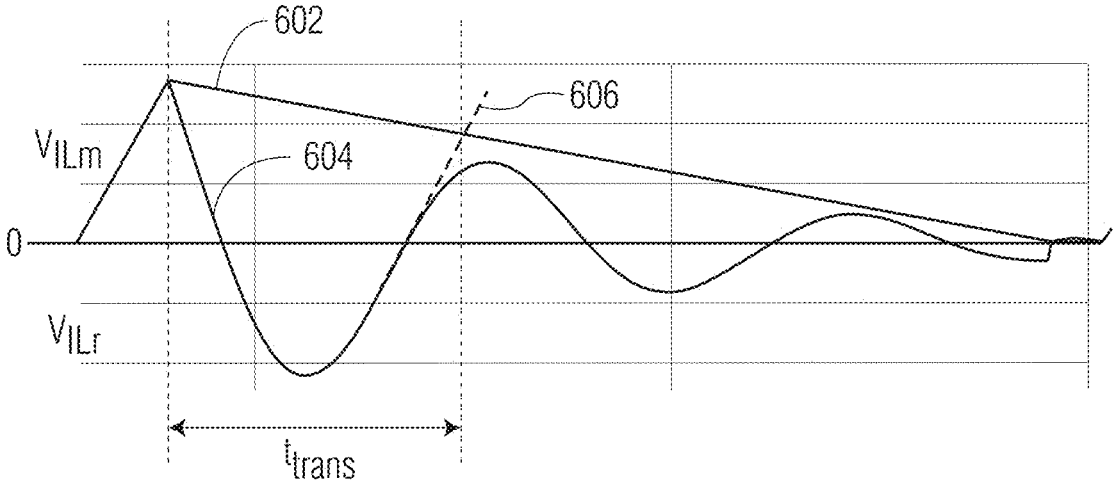
FIG. 6 illustrates a plot of VILm and VILr over a cycle of the half bridge converter with ringing.

FIG. 6 illustrates a plot of VILm and VILr over a cycle of the half bridge converter 100 with ringing. The plot of VILm 602 is as previously shown. The plot of VILr 604 shows that the value never becomes equal to the value of VILm 602 and the value rings or oscillates over time. While the value of VILm 602 is increasing after it reaches a minimum, a derivative extension 606 may be determined, and where the derivative extension 606 crosses the plot VILm 602 indicates the time at which the gateLS signal 210 should be turned off. By extending the derivative, the end of the resonance can be determined. This method can also be used during startup. In this case also, there is no point where the measurements become equal.

When the current is positive, the gateLS signal 210 may be turned off, because there is always a current path via the body diode of low side transistor 104 which is a MOSFET. So method of determining the time to turn off the gateLS signal 210 may include determining a positive derivative at a zero crossing of VILr and extending the positive derivative to determine where it crosses the VILm signal. The crossing point indicates when the gateLS signal 210 should be turned off. This is also a better method when the ringing peak of VILr is far from VILm.

Turning off the low side switch when the VILr has a zero crossing with a positive derivative is not an issue when there is not a diode in parallel with the low side switch. Then the VILr stays at zero till the end of the secondary stroke, and all energy is transferred to the secondary side. In some situations this improves the behavior.

As described above, the VILr signal is extended the moment the resonance end may be detected. Determining a VILr extension is easier to implement than detecting a derivative (i.e., a dvdt change) in the VILr signal as the derivative is very sensitive to noise.

Figure 7:
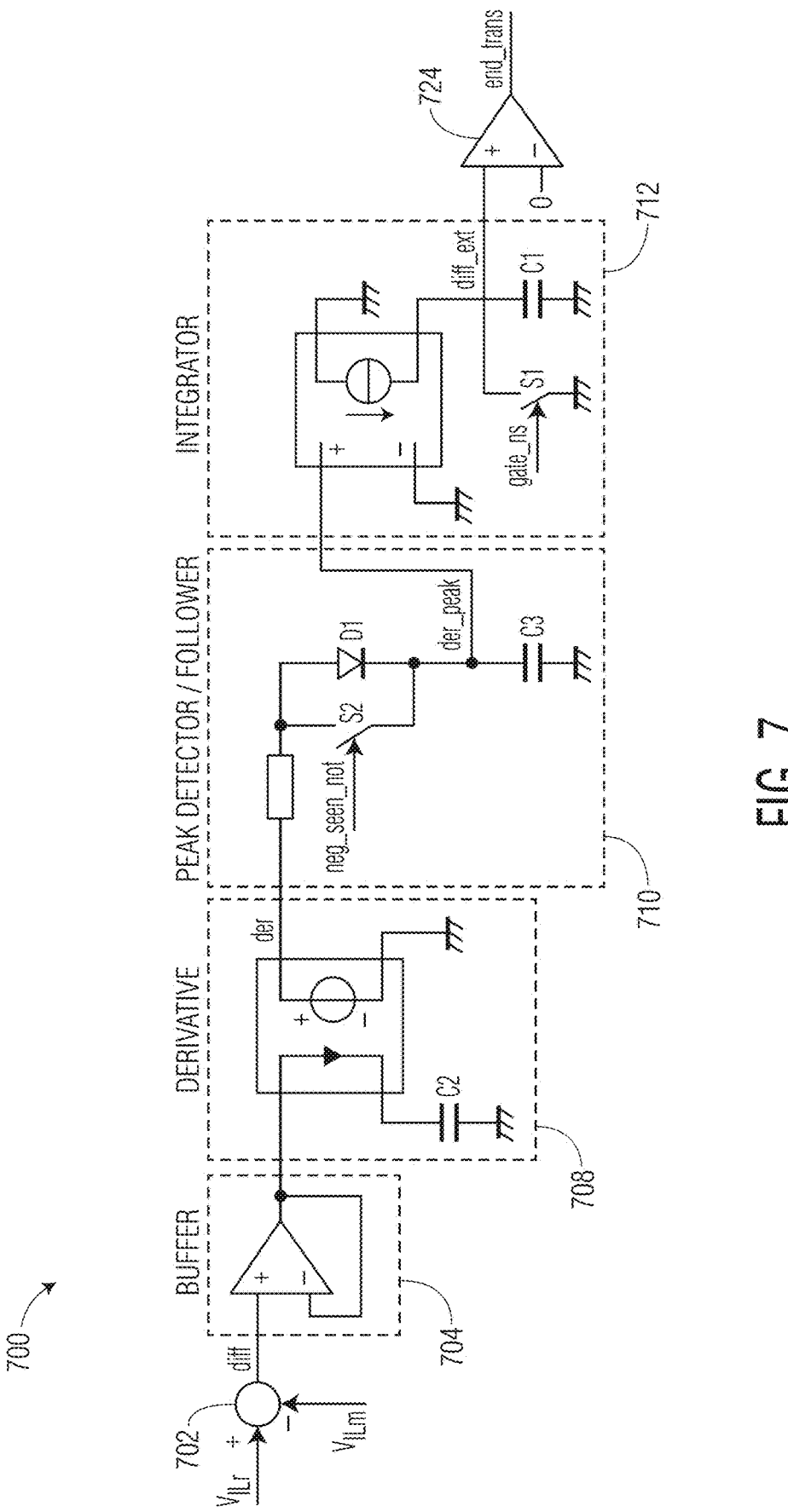
FIG. 7 illustrates and embodiment of an adaptive transition controller.

FIG. 7 illustrates and embodiment of an adaptive transition controller. The adaptive transition controller 700 includes adder 702, buffer 704, derivative circuit 708, peak detector 710, integrator circuit 712, and output comparator 724.

The adder 702 or difference circuit takes the difference between input signals VILr and VILm and produces a diff signal. The buffer 704 buffers the diff signal. The buffered diff signal is input into the derivative circuit 708 that produces a der signal that is indicative of the derivative of the diff signal. The peak detector 710 receives the der signal as an input, and over a specific time period outputs the peak value der_peak of the der signal. The peak value output der_peak of the peak detector 710 is maintained until the peak detector 710 is reset for a new cycle. The der_peak signal in input into the integrator circuit 712. The integrator circuit 712 integrates the received der_peak value to extend the diff value. The diff_ext value is input into the output comparator 724 and compared to zero to produce the end_trans signal. The end_trans signal indicates that the adaptive transition controller 700 turns off the low side transistor 104 by driving the GateLS signal low.

Figures 8A, 8B, 8C, 8D, 8E:
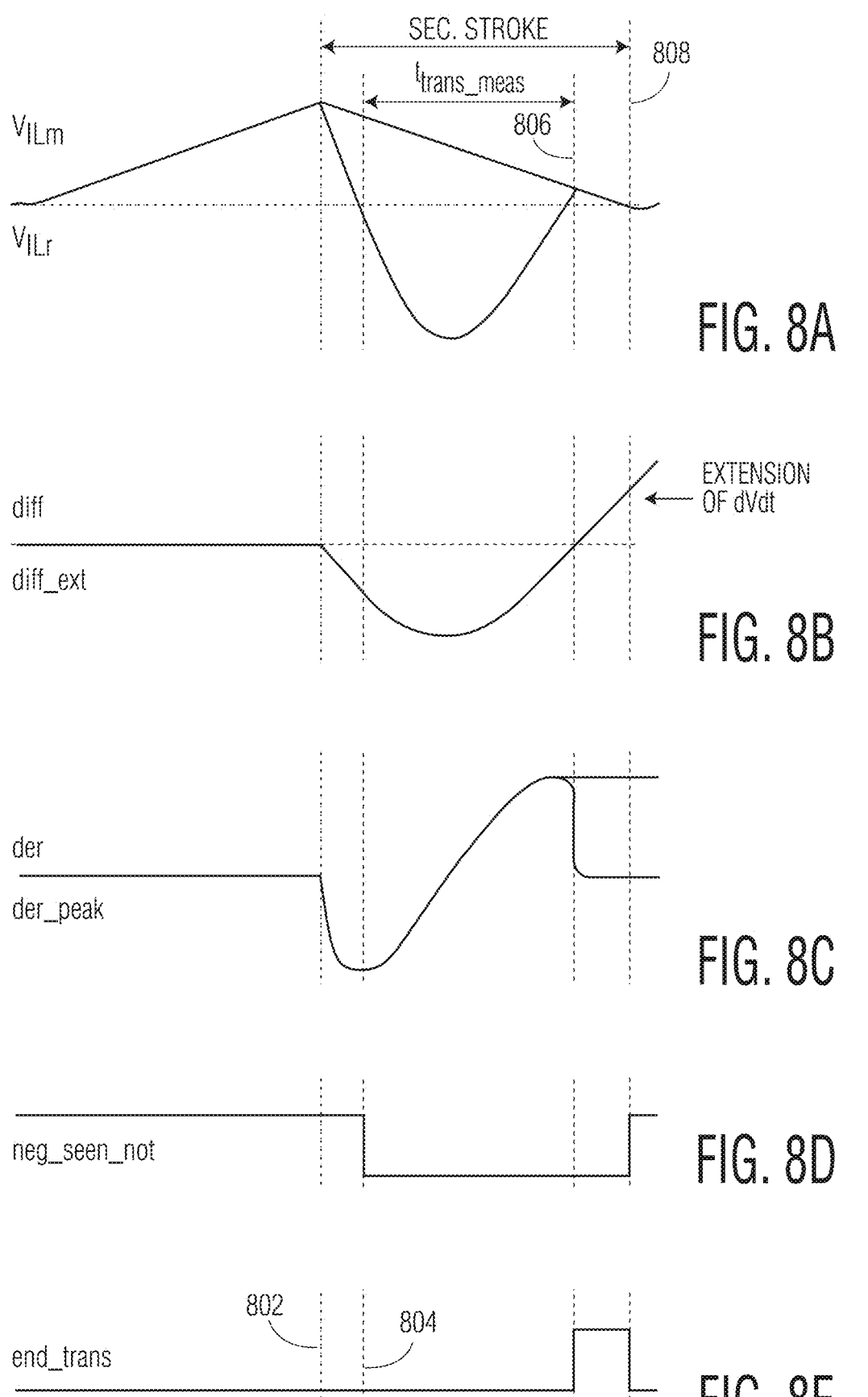
FIGS. 8A-E illustrates plots of various signals in the adaptive transition controller.

FIGS. 8A-E illustrates plots of various signals in the adaptive transition controller 700. FIG. 8A illustrates a plot of the signals VILm and VILr. FIG. 8B illustrates a plot of the signals diff and diff_ext. FIG. 8C illustrates a plot of the der and der_peak signals. FIG. 8D illustrates a plot of the signal neg_not_seen signal. FIG. 8E illustrates a plot of the end_trans signal.

During the beginning of the operation cycle of the adaptive transition controller 700, VILm and VILr have the same linearly increasing value until the beginning of the secondary stroke 802. During this time the diff, diff_ext, der, and der_peak signals are zero. The neg_seen_not signal is high. Also the end_trans signal is low.

Once the secondary stroke begins at 802, the VILm signal starts decreasing linearly and the VILr drops as well at a greater rate than VILm signal. The diff, diff_ext, and der, signals drop. The end_trans signal maintains its value. At a time 804, the VILr signal goes negative and at this time 804 the neg_seen_not signal goes low. When the neg_seen_not signal goes low the switch is opened so that the capacitor C3 in the peak detector 710 can store the peak value of the der signal and to allow the peak detector 710 to start detecting the peak of the der signal. The peak detector 710 only starts producing a peak value once the der signal starts increasing after a minimum value is reached.

At time 806, the diff_ext signal becomes greater than zero as indicated by the end_trans signal becoming high indicating that the GateLS signal should be turned off by going low. At this time 806, the GateLS signal will be turned off.

Then at the time 808 the secondary stroke ends. At this time the signal neg_seen_not goes high to reset the peak detector 710 back to zero, which closes the switch S2 in the peak detector 710. The other signals may be set to effectively reset the adaptive transition controller 700 to allow for the next cycle to begin.

In theory the method described above with respect to adaptive transition controller 700 works, but when noise is added to the input signals, the circuit seems to be very sensitive to noise. The input of the derivative block should be filtered. The disadvantage of this is that it is desired to filter the derivative signal, which is sensitive for noise, but it is also desired to filter the signal itself and a large delay is the result. The solution for this is splitting the input signal with different filters for signal generation and the extension circuit. This circuit will now be described.

Figure 9:
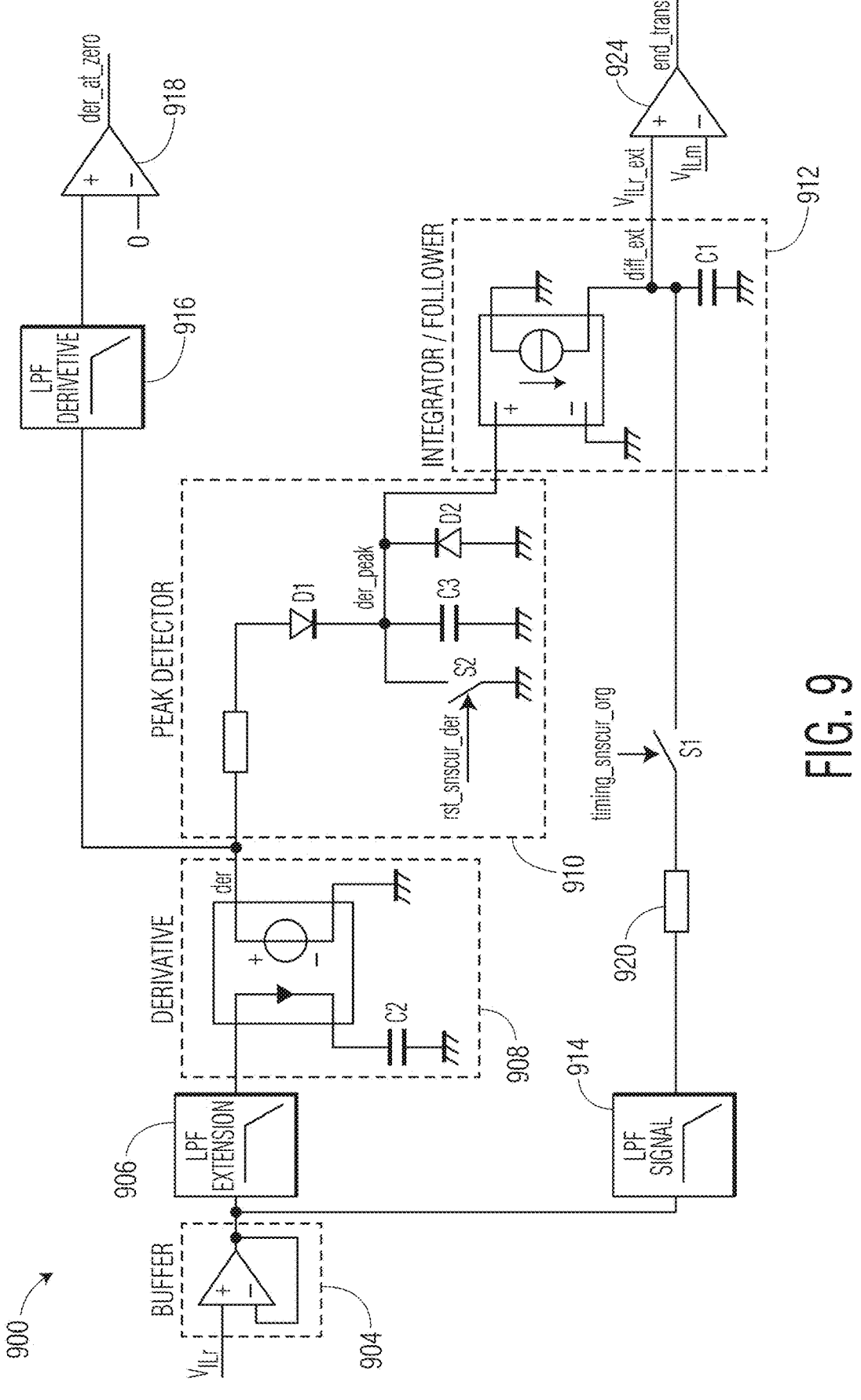
FIG. 9 illustrates a adaptive transition controller according to an embodiment.

FIG. 9 illustrates a adaptive transition controller according to an embodiment. The adaptive transition controller 900 includes buffer 904, extension filter 906, derivative circuit 908, peak detector 910, integrator circuit 912, signal filter 914, derivative filter 916, derivative comparator 918, resistor 920, signal switch 922, and output comparator 924.

The adaptive transition controller 900 receives the input signal VILr. A buffer 904 receives the input signal VILr, and the output of the buffer 904 is connected to the extension filter 906 and signal filter 914. The signal filter 914 may be for example a first order low pass filter (LPF). The extension filter 906 may include a first order LPF and a second order LPF in series resulting in a third order filter. Because the derivative circuit and peak detector is very sensitive noise, this higher order filter is used. In any case the extension filter 906 will typically be of a higher order than the signal filter 914.

The output of signal filter 914 is connected to resistor 920 and then signal switch 922. The signal switch 922 is controlled by a control signal timing_snscur_org. The output of the switch is fed into the integrator circuit 912.

The output of the extension filter 906 is fed into the derivative circuit 908. The derivative circuit may be implemented various ways as is known in the art. The output of the derivative circuit 908 is a signal der indicative of the derivative of the filtered input signal VILr. The derivative signal der is fed into an optional derivative filter 916, and the filter output is fed into derivative comparator 918. The derivative comparator 918 compares the filtered derivative signal der to zero to determine when the value of the derivative is above zero.

The peak detector 910 receives the der signal and produces a der_peak signal that is a peak value of the der signal during a period of time. The peak detector 910 includes a switch S2 that acts as part of a reset circuit that receives a rst_snscur_der signal that resets the peak detector periodically according to the operation cycle of the adaptive transition controller 900. The der signal accumulates on the capacitor C3 to produce and maintain the der_peak signal.

The integrator circuit 912 receives and integrates the der_peak signal to produce VILr_ext.

The output comparator 924 receives the VLIr_ext signal and the VILm signal and compares them. The output comparator 924 drives the end_trans signal high when VILr_ext exceeds VILm signal. The end_trans signal indicates that the adaptive transition controller 900 turns off the low side transistor 104 by driving the GateLS signal low.

Figures 10A, 10B, 10C, 10D, 10E, 10F, 10G:
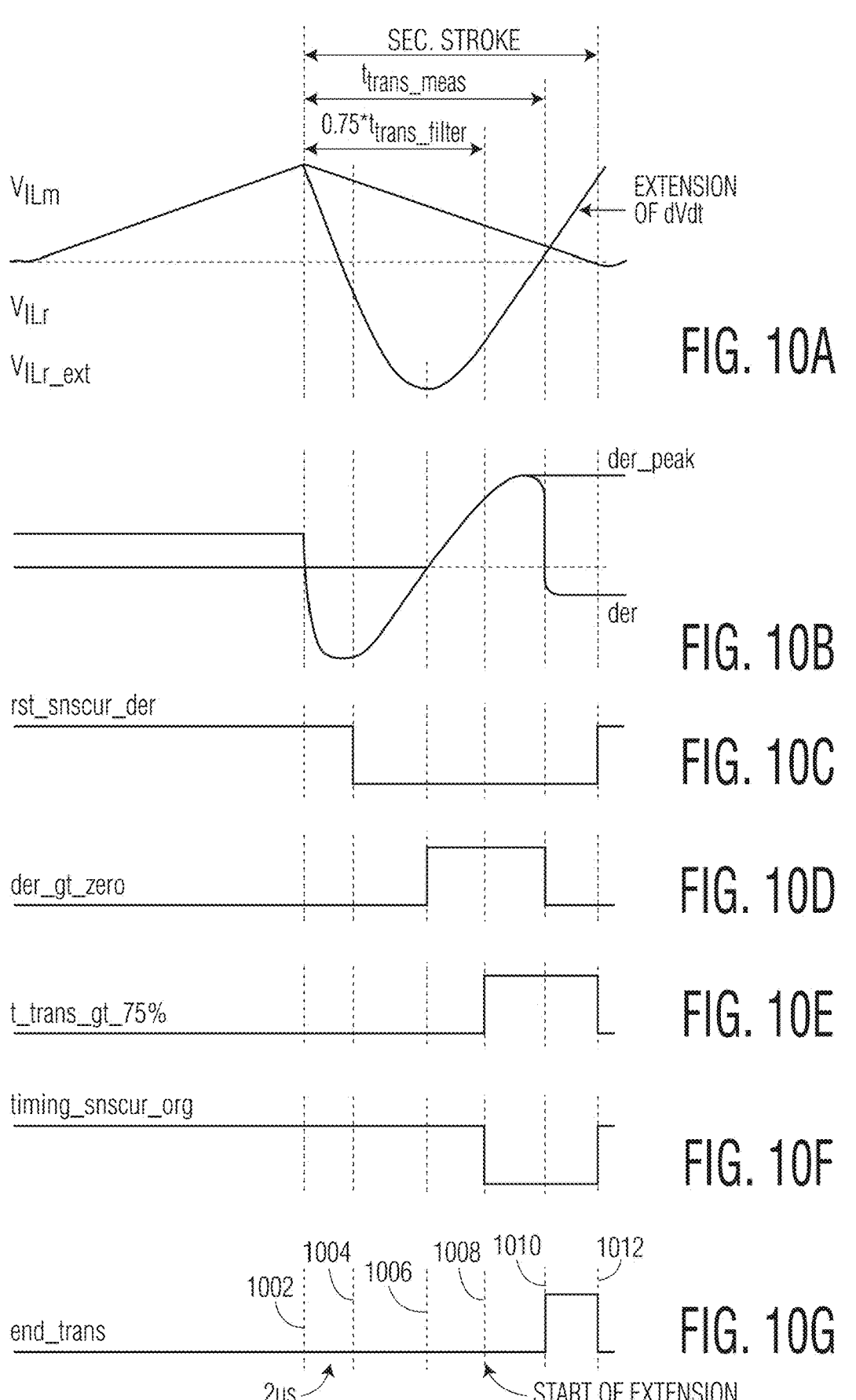
FIGS. 10A-G illustrates plots of various signals in the adaptive transition controller.

FIGS. 10A-G illustrates plots of various signals in the adaptive transition controller 900. Various timing lines are illustrated to show various time periods during the operation of the adaptive transition controller 900. FIG. 10A illustrates a plot of the signals VILm and VILr and the extension of VILr VILr_ext. FIG. 10B illustrates a plot of the signals der and der_max VILr_ext. FIG. 10C illustrates a plot of the rst_snscur_der signal. FIG. 10D illustrates a plot of the signal der_gt_zero signal. FIG. 10E illustrates a plot of the t_trans_gt_75% signal. FIG. 10F illustrates a plot of the timing_snscur_org signal. FIG. 10G illustrates a plot of the end_trans signal.

During the beginning of the operation cycle of the adaptive transition controller 800, VILm and VILr have the same linearly increasing value until the beginning of the secondary stroke 1002. During this time the der_peak signal is zero and the der signal has a fixed value based upon the slope of the VILr signal. The rst_snscur_der signal is high and der_gt_zero is low during this period. Also the t_trans_gt_75% and end_trans signals are low. Also the timing_snscur_org signal is high during this period.

Once the secondary stroke begins at 1002, the VILm signal starts decreasing linearly and the VILr drops as well at a greater rate than VILm signal. The der signal drops and reaches a minimum value. The other signals res_snscur_der, der_gt_zero, t_trans_gt_75%, timing_snscur_org, and end_trans signals maintain their values. At a time 1004, which in this example is 2 us but could be other values, the rst_snscur_der signal goes low to allow the peak detector 910 to start detecting the peak of the der signal. The der_peak signal is clamped to zero because peak detector 910 only starts producing a peak value once the der signal increases above zero.

At time 1006 the der signal becomes greater than zero as indicated by the der_gt_zero signal becoming high, and the der_peak signal follows the der signal.

At a time 1008, which is 75% of the filtered measured transition time, the signal t_trans_gt_75% goes high indicating that the time 1008 has been reached. At this same time 1008, the signal timing_snscur_org goes low. This opens signal switch 922. When the signal switch 922 is closed the input signal is placed on the capacitor C1 in the integrator circuit 912 to produce the output signal VILr_ext. So while the signal switch 922 is closed, the value VILr_ext tracks the value VILr. But with the signal switch 922 open, the integrator circuit 912 integrates the der_peak signal from the peak detector 910 on top of the value of the VILr signal on capacitor C1. Hence the value of VILr_ext is extended from the VILr value at time 1008 by integrating the peak deriva-tive value der_peak. Further the der signal drops, but the der_peak value maintains the peak value of the der signal to generate the VILr_ext signal.

When the VILr_ext crosses the VILm value at time 1010, the signal end_trans goes high indicating that the GateLS signal should be turned off by going low. At this time 1010, the GateLS signal will be turned off.

Then at the time 1012 the secondary stroke ends. At this time the signal rst_snscur_der goes high to reset the peak detector 910 back to zero. The t_trans_gt_75% signal goes low and the timing_snscur_org goes high to close the signal switch 922. Also the end_trans signal goes low. These signal changes effectively resets the adaptive transition controller 900 to allow for the next cycle to begin.

In the adaptive transition controller 900 care has to be taken as to when the extension is turned on. As long as timing_snscur_org is high, the integrator capacitor C1 is forced by the signal VILr. When the timing_snscur_org is low, the signal VILr is disconnected, and the der_peak signal ensures via the integration that the signal VILr is extended as the signal VILIr_ext. In one embodiment, the extension path is turned on (i.e., when timing_snscur_org becomes low), when: the derivative is larger than zero (i.e., when der_gt_zero is high), and the actual transition time is larger than 0.75 times the filtered transition time; and when the der_gt_zero signal stays low and the actual transition time is larger than the filtered transition time. The extension path stays active till end of the secondary stroke. Other percent-ages of the filtered or unfiltered transition time may also be used. In another embodiment, the extension path is turned on when the when the actual transition time is larger than the filtered transition time minus an offset time (e.g., 500 ns).

In the adaptive transition controller 900 VILr is used instead of the diff signal of adaptive transition controller 700. The adaptive transition controller 900 will also work with the diff signal as input and making the negative input of the end_trans comparator zero.

Figure 11:
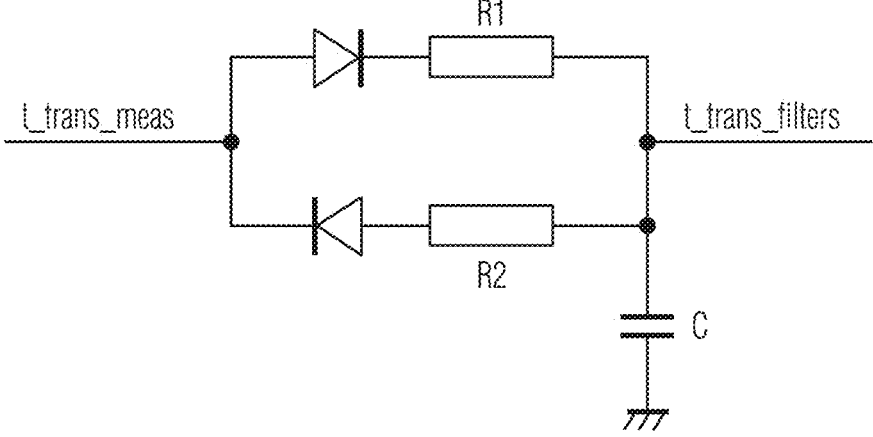
FIG. 11 illustrates an example of a transmission time filter.

In the adaptive transition controller 900, the filtered transition time (t_trans_filter) is used to turn on the exten-sion path. This filter can be simply the measured transition time of the previous cycle, but can also be a normal filter or an asymmetric filter, which is faster when the time increases than when the time decreases. FIG. 11 illustrates an example of such a filter. In FIGS. 11 R1 and R2 may have the following resistance values:

$$R_1 = \frac{1}{2\pi f_{c\_h} C};$$

$$R_2 = \frac{1}{2\pi f_{c\_l} C}.$$

Where $f_{c\_h}=10\cdot10^{13}$ and $f_{c\_l}=1\cdot10^{13}$ and the diodes are ideal diodes with $V_f=0V$. This filter may also be implemented digitally as well.

In general the gate of the low side transistor 104 is turned off via the GateLS signal during the secondary stroke when the end_trans signal goes high. To make the system even more noise insensitive, the following two conditions will be true: the end_trans signal is high; and the secondary time is larger than the filtered transition time.

It is noted that in the description above high and low logical states were described. Throughout the described embodiments these states may be swapped to control the circuits.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combi-nation of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be imple-mented in different forms of hardware, firmware, and/or a combination of hardware and software. The actual special-ized control hardware or software code used to implement these systems and/or methods is not limiting of the aspects. Thus, the operation and behavior of the systems and/or methods were described herein without reference to specific software code—it being understood that software and hard-ware can be designed to implement the systems and/or methods based, at least in part, on the description herein.

As used herein, the term "non-transitory machine-read-able storage medium" will be understood to exclude a transitory propagation signal but to include all forms of volatile and non-volatile memory. When software is imple-mented on a processor, the combination of software and processor becomes a specific dedicated machine.

Because the data processing implementing the embodi-ments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "sec-ond" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. An adaptive transition controller for a resonant converter system, comprising:
   a derivative circuit configured to receive a first signal indicative of a resonant current through an inductor in the resonant converter system and produce a derivative signal indicative of a derivative of the first signal;
   a peak detector circuit configured to produce a peak signal indicative of a peak value of the derivative signal over a time period;
   an integrator circuit configured to integrate the peak signal to produce an extension signal; and
   a comparator circuit configured to produce an end transition signal when the extension signal exceeds a second signal indicative of a magnetizing current in a magnetizing inductance of a transformer in the resonant converter system.

2. The adaptive transition controller of claim 1, further comprising an extension filter connected to the derivative circuit, wherein the extension filter is configured to filter the first signal.

3. The adaptive transition controller of claim 2, further comprising a signal filter connected to the integration circuit via a first switch, wherein the signal filter is configured to filter the first signal.

4. The adaptive transition controller of claim 3, wherein the extension filter is a higher order filter than the signal filter.

5. The adaptive transition controller of claim 3, wherein
   the integration circuit is configured to start integrating the peak signal at an extension start time, and
   the first switch is configured to be closed at a beginning of an operation cycle and to be opened at the extension start time.

6. The adaptive transition controller of claim 5, wherein the extension start time is based upon a prior transition time during a prior operating cycle of the resonant converter system.

7. The adaptive transition controller of claim 5, wherein the extension start time is based upon a filtered prior transition time during a prior operating cycle of the resonant converter system.

8. The adaptive transition controller of claim 5, wherein the first switch is connected to a capacitor in the integrator circuit.

9. The adaptive transition controller of claim 8, wherein the capacitor in the integrator circuit holds a voltage based upon the first signal when the first switch is closed and a voltage based upon the first signal plus the integrated derivative signal when the first switch is opened.

10. The adaptive transition controller of claim 1, further comprising
   a derivative filter connected to the derivative circuit, the derivative filter configured to filter the derivative signal; and
   a derivative comparator configured to produce a derivative greater that zero signal when the derivative signal exceeds zero during a secondary stroke of an operating cycle of the resonant converter system.

11. The adaptive transition controller of claim 10, wherein the integration circuit is configured to start integrating the peak signal at an extension start time if the derivative greater that zero signal indicates that the derivative signal exceeds zero.

12. The adaptive transition controller of claim 1, wherein the peak detector circuit includes a reset circuit configured to reset the peak detector circuit.

13. The adaptive transition controller of claim 12, wherein the reset circuit is configured to release the peak detector circuit after the derivative signal reaches a minimum value.

14. A adaptive transition controller for a resonant converter system, comprising:
   a subtractor circuit configured to produce a difference signal that is a difference between a first signal indicative of a current through an inductor in the resonant converter system and a second signal indicative of a magnetizing current through a transformer in the resonant converter system;
   a derivative circuit configured to receive the difference signal and produce a derivative signal indicative of a derivative of the difference signal;

a peak detector circuit configured to produce a peak signal indicative of a peak value of the derivative signal over a time period;

an integrator circuit configured to integrate the peak signal to produce an extension signal; and a comparator circuit configured to produce an end transition signal when the extension signal exceeds zero;

wherein the integration circuit includes a first switch is controlled by a gate high side control signal, wherein a gate high side signal controls a gate of a gate high side transistor in the resonant converter system and the first switch is configured to be closed at a beginning of an operation cycle and to be opened during an operation cycle of the resonant converter system.

15. The adaptive transition controller of claim 14, wherein the first switch is connected to a capacitor in the integrator circuit.

16. The adaptive transition controller of claim 14, wherein the peak detector circuit includes a second switch configured to reset the peak detector circuit.

17. The adaptive transition controller of claim 16, wherein the second switch is configured to release the peak detector circuit after the derivative signal reaches a minimum value.

18. A method for controlling an adaptive transition time of a resonant converter system, comprising:

producing a derivative signal that is a derivative of a received first signal indicative of a resonant current through a inductor in the resonant converter system;

producing a peak derivative signal indicative of a peak value of the derivative signal over a time period;

integrating the peak derivative signal to produce an extension signal; and a comparing the extension signal to a second signal indicative of a magnetizing current through a magnetizing inductance of a transformer in the resonant converter system to produce an end transition signal when the extension signal exceeds the second signal.

19. The method of claim 18, further comprising:

filtering the first signal by a first filter before producing the derivative signal; and filtering the first signal by a second filter wherein integrating the peak derivative signal is based on an output of the second filter, wherein the first filter is a higher order filter than the second filter.

\* \* \* \* \*